US011442863B2

(12) United States Patent
Shulyak et al.

(10) Patent No.: US 11,442,863 B2
(45) Date of Patent: Sep. 13, 2022

(54) DATA PROCESSING APPARATUS AND METHOD FOR GENERATING PREFETCHES

(71) Applicant: Arm Limited, Cambridge (GB)

(72) Inventors: Alexander Cole Shulyak, Austin, TX (US); Adrian Montero, Austin, TX (US); Joseph Michael Pusdesris, Austin, TX (US); Karthik Sundaram, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 122 days.

(21) Appl. No.: 17/093,792

(22) Filed: Nov. 10, 2020

(65) Prior Publication Data

US 2022/0147459 A1   May 12, 2022

(51) Int. Cl.
  *G06F 12/0862* (2016.01)
(52) U.S. Cl.
  CPC .... *G06F 12/0862* (2013.01); *G06F 2212/602* (2013.01)
(58) Field of Classification Search
  CPC ................ G06F 12/0862; G06F 2212/602
  See application file for complete search history.

(56) References Cited

U.S. PATENT DOCUMENTS

| 6,275,918 B1 * | 8/2001 | Burky | G06F 9/3455 |
| | | | 712/225 |
| 6,721,870 B1 * | 4/2004 | Yochai | G06F 3/0689 |
| | | | 711/204 |
| 2006/0026408 A1 * | 2/2006 | Morris | G06F 9/30061 |
| | | | 712/E9.052 |
| 2007/0088919 A1 * | 4/2007 | Shen | G06F 12/0815 |
| | | | 711/E12.057 |
| 2010/0241813 A1 * | 9/2010 | Shen | G06F 9/544 |
| | | | 711/144 |
| 2017/0168946 A1 * | 6/2017 | Wang | G06F 12/0862 |

(Continued)

OTHER PUBLICATIONS

A. Roth et al., "Dependence Based Prefetching for Linked Data Structures," Oct. 1998, pp. 115-126.

(Continued)

*Primary Examiner* — Prasith Thammavong
(74) *Attorney, Agent, or Firm* — Nixon & Vanderhye P.C.

(57) ABSTRACT

Data processing apparatuses and methods of processing data are disclosed. The operations comprise: storing copies of data items; and storing, in a producer pattern history table, a plurality of producer-consumer relationships, each defining an association between producer load indicator and a plurality of consumer load entries, each consumer load entry comprising a consumer load indicator and one or more usefulness metrics. Further steps comprise: initiating, in response to a data load from an address corresponding to the producer load indicator in the producer pattern history table and when at least one of the corresponding one or more usefulness meets a criterion, a producer prefetch of data to be prefetched for storing as a local copy; and issuing, when the data is returned, one or more consumer prefetches to return consumer data from a consumer address generated from the data returned by the producer prefetch and a consumer load indicator of a consumer load entry.

21 Claims, 9 Drawing Sheets

(56) References Cited

U.S. PATENT DOCUMENTS

2020/0387381 A1* 12/2020 Karve ................ G06F 12/0862

OTHER PUBLICATIONS

X. Yu et al., "IMP: Indirect Memory Prefetcher", Proceedings of the 48$^{th}$ International Symposium on Microarchitecture—MICRO 48, Dec. 5-9, 2015, 14 pages.
U.S. Appl. No. 17/545,121, filed Dec. 8, 2021, Shulyak et al.
U.S. Appl. No. 17/579,842, filed Jan. 20, 2022, Shulyak et al.

* cited by examiner

DATA PROCESSING APPARATUS AND METHOD FOR GENERATING PREFETCHES

TECHNICAL FIELD

The present invention relates to data processing. More particularly the present invention relates to prefetch generation.

TECHNICAL BACKGROUND

Prefetching is a technique used by a data processing apparatus to mitigate against the latency associated with memory access, by initiating the retrieval of data values or instructions from memory before the data processing apparatus encounters the corresponding instructions to fetch those data values or instructions. In some cases prefetching is more straightforward, for example when an address from which a data value is to be loaded is directly specified in a corresponding instruction, since this will generally result in a more regular pattern of accesses, because each time this instruction is encountered the load comes from the same address. However prefetching becomes more difficult when a load instruction is a "consumer load", where the address from which a data value is to be loaded is indirectly specified, being based on a data value returned in an earlier "producer load". Variability in that data value thus results in variability in the address which the consumer load accesses and thus a more variability in the pattern of accesses. Accordingly, such producer-consumer load relationships can result in an irregular and non-repeating access pattern, making it difficult to identify and schedule prefetches.

SUMMARY

In example embodiments described herein there is a data processing apparatus comprising: a data cache to store local copies of data items for use during execution of instructions by processing circuitry; a producer pattern history table to store a plurality of producer-consumer relationships, each producer-consumer relationship defining an association between a producer load indicator and a plurality of consumer load entries, each consumer load entry comprising a consumer load indicator and one or more usefulness metrics; and prefetch generation circuitry to generate a prefetch of data for the data cache based on a data load from an address, wherein the prefetch generation circuitry is adapted to, when the data load corresponds to the producer load indicator in the producer pattern history table and when at least one of the corresponding one or more usefulness metrics associated with the producer load indicator meets a criterion: initiate a producer prefetch of the data; and when the data is returned, issue one or more consumer prefetches, each consumer prefetch to return corresponding consumer data from a corresponding consumer address generated from the data returned by the producer prefetch and a corresponding consumer load indicator of a corresponding consumer load entry.

In example embodiments described herein there is a method of processing data comprising: storing local copies of data items for use during execution of instructions by processing circuitry; storing, in a producer pattern history table, a plurality of producer-consumer relationships, each producer-consumer relationship defining an association between producer load indicator and a plurality of consumer load entries, each consumer load entry comprising a consumer load indicator and one or more usefulness metrics; initiating, in response to a data load from an address corresponding to the producer load indicator in the producer pattern history table and when at least one of the corresponding one or more usefulness metrics associated with the producer load indicator meets a criterion, a producer prefetch of data to be prefetched for storing as a local copy; and issuing, when the data is returned, one or more consumer prefetches, each consumer prefetch to return corresponding consumer data from a corresponding consumer address generated from the data returned by the producer prefetch and a corresponding consumer load indicator of a corresponding consumer load entry.

In example embodiments described herein there is a data processing apparatus comprising: means for storing local copies of data items for use during execution of instructions by processing circuitry; means for storing, in a producer pattern history table, a plurality of producer-consumer relationships, each producer-consumer relationship defining an association between producer load indicator and a plurality of consumer load entries, each consumer load entry comprising consumer load indicator and one or more usefulness metrics; means for initiating, in response to a data load from an address corresponding to the producer load indicator in the producer pattern history table and when at least one of the corresponding one or more usefulness metrics associated with the producer load indicator meets a criterion, a producer prefetch of data to be prefetched into the means for storing based on the data load; and means for issuing, when the data is returned, one or more consumer prefetches, each consumer prefetch to return corresponding consumer data from a corresponding consumer address generated from the data returned by the producer prefetch and a corresponding consumer load indicator of a corresponding consumer load entry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
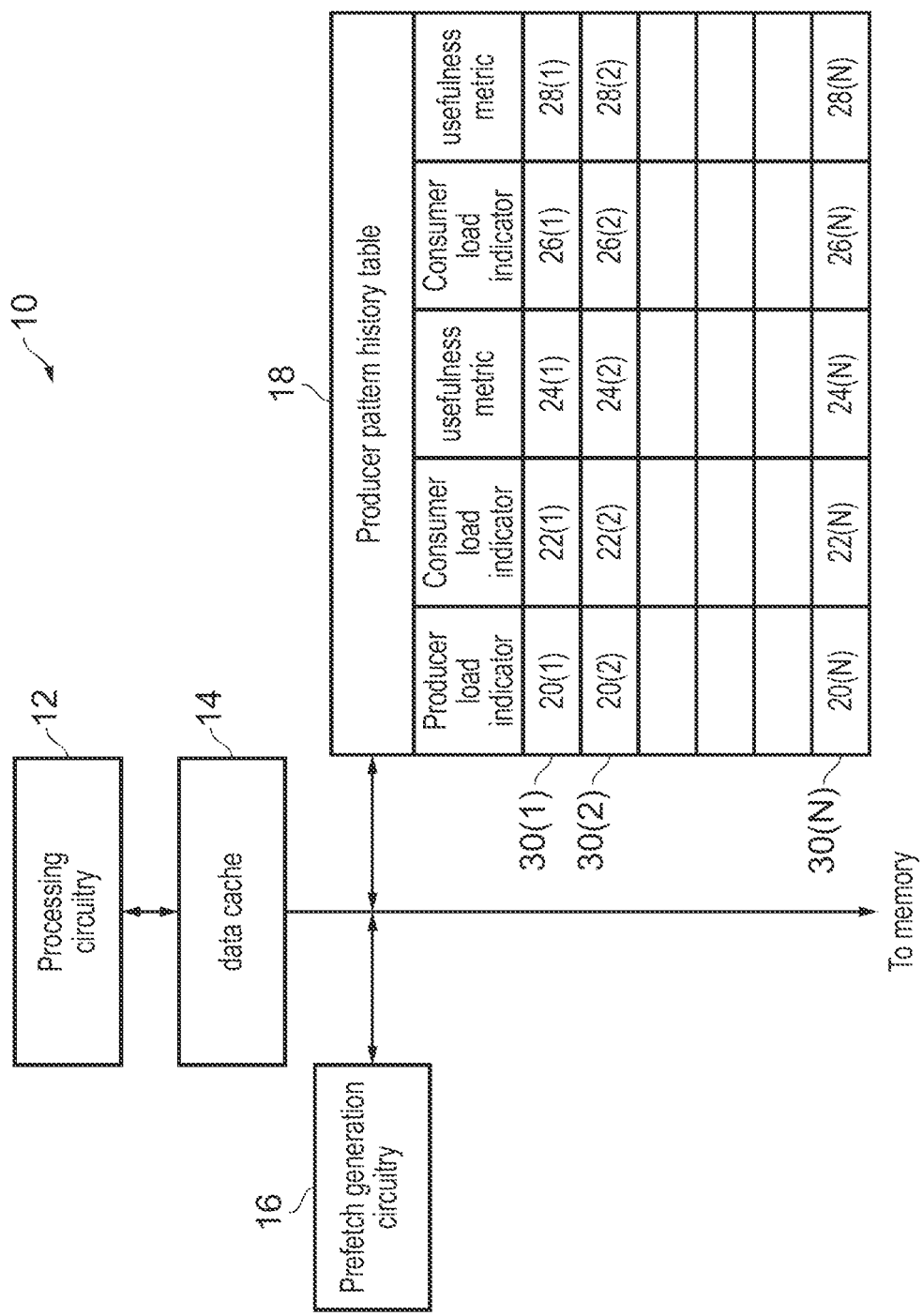
FIG. 1 schematically illustrates details of a data processing apparatus in some embodiments.

Before discussing the embodiments with reference to the accompanying figures, the following description of embodiments is provided.

In accordance with some example configurations there is provided a data processing apparatus comprising: a data cache to store local copies of data items for use during execution of instructions by processing circuitry; a producer pattern history table to store a plurality of producer-consumer relationships, each producer-consumer relationship defining an association between a producer load indicator and a plurality of consumer load entries, each consumer load entry comprising a consumer load indicator and one or more usefulness metrics; and prefetch generation circuitry to generate a prefetch of data for the data cache based on a data load from an address, wherein the prefetch generation circuitry is adapted to, when the data load corresponds to the producer load indicator in the producer pattern history table and when at least one of the corresponding one or more usefulness metrics associated with the producer load indicator meets a criterion: initiate a producer prefetch of the data; and when the data is returned, issue one or more consumer prefetches, each consumer prefetch to return corresponding consumer data from a corresponding consumer address generated from the data returned by the producer prefetch and a corresponding consumer load indicator of a corresponding consumer load entry.

During the execution of instructions the processing circuitry may make use of a number of data items. Data items stored as local copies in the data cache provide lower latency during accesses due to the physical locality of the cache with respect to the processing circuitry, the bandwidth for data transfer between the processing circuitry and the cache, and so on. If a data item is already present in the cache when it is required by the processing circuitry the data item is accessed more quickly than if the processing circuitry has to wait for the data processing apparatus to retrieve the data item from storage that is located further downstream (i.e., further from the processing circuitry) in the memory hierarchy. In order to reduce the time that the processing circuitry has to wait for data to be retrieved, prefetching techniques are used to predict which data is likely to be required by the processing circuitry before the processing circuitry encounters a load instruction specifying that data. Prefetching circuitry can achieve this for regular and repeating data accesses through the analysis of data access patterns. However, prefetching becomes more difficult in cases where data access patterns have irregular and/or non-repeating access patterns.

A common set of data accesses that have an irregular and/or non-repeating access pattern are loads that exhibit a producer-consumer relationship, where a consumer load is a load that is based on the data returned by the producer load. The inventors have realised that producer-consumer relationships may involve a single producer load on which a plurality of consumer loads are based. In order to identify producer-consumer relationships and issue corresponding prefetches there is provided a producer pattern history table. The producer pattern history table stores a plurality of producer-consumer relationships. Each of the producer-consumer relationships define a correspondence between a producer load indicator, which can be used to identify when a load or a prefetch is likely to be a producer load, and a plurality of consumer load entries where each consumer load entry defines a consumer load indicator and one or more usefulness metrics. In this way not only can a load (where it is implicit that such a load may also itself be a prefetch load) be identified as a producer load, but corresponding consumer loads, that have been identified as being likely to be based on the data returned from the producer load, can also be identified and issued as consumer prefetches.

In response to a data load/prefetch from an address, the prefetch generation circuitry first checks to determine whether the data load corresponds to a producer load indicator stored in the producer pattern history table. If the data load hits in the producer pattern history table then it is determined, based on whether the one or more usefulness metrics (which will be described in more detail below) associated with the entry that hit in the producer pattern history table meet a criterion, whether to generate a producer prefetch corresponding to the load. If the criterion is met, then the prefetch generation circuitry generates a producer prefetch specifying the data. When the data has been returned, the prefetch generation circuitry is able to use this data, in combination with the plurality of corresponding consumer load indicators, to generate one or more consumer prefetches based on this data. In this way loads that exhibit a producer-consumer relationship can be identified and a producer prefetch can be issued, from which one or more consumer prefetches can be issued once the data associated with the producer prefetch has been returned. Whilst the producer pattern history table is adapted to store a plurality of (two or more) consumer prefetches in association with each producer prefetch, the prefetch generation circuitry may generate one or more consumer prefetches as discussed below.

The producer load indicator may comprise any indicator that defines the producer load. For example, in some embodiments the producer load indicator may comprise a program counter value indicative of the program position of the producer load instruction corresponding to the producer load. In other alternative embodiments the producer load indicator may comprise an address indicator indicative of an address from which data associated with the producer load is to be loaded. Similarly, the consumer load indicator comprises an indicator that defines the consumer load. For example, the consumer load indicator may comprise a program counter value indicative of a program position of the consumer load instruction corresponding to the consumer load. Alternatively, the consumer load indicator may comprise a program counter offset or other information from which the program counter value indicative of a position in the consumer load instruction can be derived.

In accordance with some example configurations the consumer load indicator comprises an offset in address space between the data returned by the producer prefetch and the corresponding consumer address. In this way the offset can be combined with the data returned by the producer prefetch in order to determine the corresponding consumer address. The person of ordinary skill in the art will recognise that this is not the only way in which the consumer load indicator could be defined and that, in other embodiments, the consumer load indicator could comprise any information from which the consumer address can be derived. For example, the consumer load indicator could comprise an operand to be used in a mathematical operation from which the consumer address can be calculated. Such operands include, but are not limited to: a partial offset such that the consumer address can be derived from the data returned from the producer prefetch, the partial offset and another offset either hardwired into the prefetch generation circuitry or defined elsewhere in the data processing apparatus; a multiplier to generate the consumer address as a result of the data returned from the producer prefetch multiplied by the multiplier; an index into a table identified by the data returned from the producer prefetch; and so on.

In accordance with some example configurations, when the consumer load indicator corresponds to a further producer load indicator in the pattern history table, the consumer prefetch is issued as a further producer prefetch. This results in a potentially recursive scheme in which a first producer load can generate a first plurality of consumer prefetches, and where each of the first plurality of consumer prefetches could correspond to an entry in the producer pattern history table. For each of the first plurality of consumer prefetches that corresponds to an entry in the producer pattern history table, the corresponding consumer prefetch is instead issued as a producer prefetch which will generate a second plurality of consumer prefetches. Each of the second plurality of consumer prefetches may, in turn, also be issued as producer prefetches if they correspond to an entry in the producer pattern history table.

In accordance with some example configurations, issuing the further producer prefetch is independent of whether the corresponding usefulness metric meets the criterion. As the initial prefetch is only issued as a producer prefetch when the corresponding usefulness metric meets the criterion, the further producer prefetches may be assumed to meet the usefulness criterion because the producer prefetch has already been determined to be useful.

In accordance with some example configurations the further producer prefetch is associated with a prefetch depth counter indicative of a number of preceding producer prefetches from which the further producer prefetch is derived, and wherein when the prefetch depth counter reaches a depth threshold, the further producer prefetch is discarded. As a result of the recursive way in which producer prefetches may be generated, it is possible that the producer prefetch can generate a further producer prefetch, which in turn generates a still further producer prefetch. In order to prevent the possibility of recursive generation of producer prefetches continuing indefinitely, the prefetch generation circuitry restricts the maximum number of recursively generated producer prefetches from exceeding a maximum depth defined by the depth threshold. For example, if the depth threshold was three, then the producer prefetch (depth counter=0) could generate a further producer prefetch (depth counter=1) which could, in turn, generate another further producer prefetch (depth counter=2). However, the another further producer prefetch (depth counter=2) would be unable to generate a producer prefetch with depth counter=3 because the depth counter has reached the threshold depth. It will be appreciated by the person of ordinary skill in the art that the choice of three for the depth threshold is purely by way of example and that any value could be used for the threshold depth. In addition, the condition of the depth counter reaching the threshold depth could be implemented by checking if the depth counter is equal to the depth threshold; checking if the depth counter has exceeded a number that is one less than the depth threshold; or by any other means by which the depth counter can be compared to the depth threshold.

In accordance with some example configurations the one or more usefulness metrics for each entry of the plurality of consumer load entries comprise a confidence value indicative that a previous load based on the corresponding consumer address was issued subsequent to the producer load, and wherein the criterion being met requires the confidence value to reach a confidence threshold. The confidence value provides a measure of whether it is likely that the consumer address, generated from the data returned by the producer prefetch and a corresponding consumer load indicator of the corresponding consumer load entry, is going to be used in a load subsequent to the producer load. In some embodiments the confidence value could be represented by a single bit indicative of whether the consumer load based on the consumer address has been observed to occur subsequent to the producer load more than a threshold number of times. In alternative embodiments, the confidence value could be represented by a counter that is indicative of a number of times that the consumer load based on the consumer address has been observed to occur subsequent to the producer load. In this way, the prefetch generation circuitry can be adapted to only issue consumer loads for which, based on previous observations, it is determined that there is a reasonable likelihood that a load based on the consumer address will follow the load based on the producer address.

In accordance with some example configurations, in addition to determining whether one or more of the confidence values associated with the producer meets a confidence threshold, the data processing apparatus may determine which consumer prefetches to issue based on whether the confidence value associated with the consumer entry meets the confidence threshold.

In accordance with some example configurations the one or more usefulness metrics for each entry of the plurality of consumer load entries comprises a timeliness value indicative of whether data loaded based on the address generated from the producer data is likely to return in time to generate a timely consumer prefetch, and wherein the criterion being met further requires the timeliness value to indicate that the producer data is likely to return in time to generate the timely consumer prefetch. The timeliness value indicates that it is likely that the data required to be returned from the consumer load is not required until a sufficient period of time has elapsed, subsequent to the producer load being issued, such that the producer load has returned the data to be used in the generation of consumer load address. For example, if the consumer load immediately follows the producer load in program execution order, it may be expected that there is not sufficient time for the producer load to return data before the consumer load based on the data returned from the producer load is issued. In this case, it may not be beneficial to issue a consumer load and therefore the timeliness value would indicate the data loaded is unlikely to return in time. The timeliness indicator may be variously defined. In some embodiments the timeliness indicator may be a single bit indicative of whether or not the consumer load is likely to return in time to generate the timely consumer prefetch. In other embodiments the timeliness value may comprise a counter indicative of a time difference between the issuing of the producer load and the issuing of the consumer load from which it can be determined, at the time that the prefetch is to be issued, whether there would be sufficient time for the data to return.

In accordance with some example configurations where the usefulness metric comprises both a confidence value and a timeliness value, the prefetch generation circuitry may be adapted to initiate the producer prefetch based on an indication that at least one of the corresponding consumer entries has both a confidence value meeting a confidence threshold and a timeliness value that indicates that the producer data is likely to return in time to generate the timely consumer prefetch. In this way producer prefetches are only generated that are inherently timely and where there is an indication that the producer prefetch will return data in that is timely with respect to a consumer prefetch for which there is a confidence value meeting the threshold confidence. In addition, when the data is returned, the prefetch generation circuitry may issue consumer prefetches independent of the corresponding timeliness values, but in dependence on the confidence value, such that only consumer entries that have a confidence value that meets the confidence threshold are issued as consumer prefetches. This is because it is assumed that, if the consumer prefetches are upgraded to further producer prefetches they will already be inherently timely due to the timeliness criterion being met by the producer prefetch.

In accordance with some example configurations the data processing apparatus further comprises producer training table circuitry to store a producer training table comprising a candidate producer-consumer relationship, and training circuitry to populate the candidate producer-consumer relationship during a training phase based on a plurality of observed loads. The producer training table stores the candidate producer-consumer relationship whilst in the training phase so that the candidate producer-consumer relationship can be built up based on the plurality observed loads. The training phase can occur either in parallel to the issuing of producer prefetches and consumer prefetches by the data processing apparatus, or during a separate training phase in which the issuing of prefetches is suppressed.

In accordance with some example configurations the one or more usefulness metrics comprises a confidence value indicative that a previous load based on the corresponding consumer address was issued subsequent to the producer load, and the training circuitry is adapted to, at the start of the training phase: when an observed load of the training phase corresponds to an existing producer load indicator in one of the plurality of producer-consumer relationships stored in the pattern history table: derive a candidate producer-consumer relationship from the producer-consumer relationship corresponding to the observed load; enter the candidate producer-consumer relationship into the producer training table; and modify candidate confidence values associated with the candidate producer-consumer relationship in a first direction; and when the observed load of the training phase does not correspond to the existing producer load indicator in any of the plurality of producer-consumer relationships stored in the pattern history table: create the candidate producer-consumer relationship comprising information indicative of the observed load; and enter the candidate producer-consumer relationship into the producer training table.

During the training phase, the training circuitry selects an observed load to be inserted into the training table stored in the training table circuitry. The observed load is selected as a load issued during the training phase, although the observed load could also be selected prior to the training phase. If the observed load corresponds has a load indicator that corresponds to a producer load indicator in an existing producer-consumer relationship that is already present in the producer pattern history table, then the existing producer-consumer relationship is used to derive the candidate producer-consumer relationship to be stored in the producer training table. When the candidate producer-consumer relationship is derived in this way, the candidate confidence values of the candidate producer-consumer relationship are modified in a first direction to indicate that the confidence in the relationship between the candidate producer and the corresponding candidate consumer is reduced. Alternatively, if the observed load has a load indicator that does not correspond to a producer load indicator in an existing producer-consumer relationship, then the candidate producer-consumer relationship to be entered into the training table is derived based on information indicative of the observed load.

In accordance with some example configurations the producer training table is adapted to store, in association with the candidate producer-consumer relationship, data returned in response to the observed load. By storing the data returned in response to the observed load, the producer training table is able to determine if a relationship exists between subsequently observed loads and the observed load.

In accordance with some example configurations for each subsequent observed load of the plurality of observed loads, in response to detecting a match between a most significant portion of the data returned by the observed load and a candidate address associated with the subsequent observed load, the training circuitry is adapted to derive a candidate consumer entry based on a difference between the least significant portion of the data returned by the observed load and the candidate address associated with the subsequent observed load. A match between the most significant portion of the candidate address and the most significant portion of the data returned by the observed load indicates that the data returned by the observed load could define an address that is close in address space to the candidate address. When this is the case the training circuitry uses the candidate address and the data returned by the observed load to derive the candidate consumer entry. As previously discussed, in some embodiments the candidate consumer entry could comprise a consumer offset in address space. In such embodiments the consumer offset could be given by the difference between the least significant portion of the data returned by the observed load and the least significant portion of the candidate address. In some embodiments the candidate consumer information can be derived by any method for which there is a one-to-one relationship between the consumer information and the difference between the candidate address and the least significant portion of the data returned by the observed load.

In accordance with some example configurations the training circuitry is adapted to: when the candidate consumer entry corresponds to an existing consumer entry of the candidate producer-consumer relationship, modify an existing candidate confidence value of the existing consumer in a second direction; when the candidate consumer entry is different from each existing consumer entry of the candidate producer-consumer relationship and when an existing consumer entry of the candidate producer-consumer relationship has a candidate confidence value that meets a replacement criterion, replace the existing consumer entry having with the candidate consumer entry; and when the candidate consumer entry is different from each existing consumer entry of the candidate producer-consumer relationship and when a corresponding candidate confidence value of each existing consumer entry does not meet the replacement criterion, discard the candidate consumer entry. In this way the existing consumer entries of the candidate producer-consumer relationship are kept up to date based on the subsequent observed loads in the training phase. As previously discussed, at the start of the training phase the confidence values of the candidate producer-consumer relationship are modified in a first direction (or "aged") to indicate that the confidence in those predictions has reduced since the producer-consumer relationship was derived. When the subsequent observed loads of the training phase have a similar behaviour to those observed in a previous training phase, as represented by the existing consumer entries, the confidence values of the existing consumer entries will be modified in a second direction to indicate that a load corresponding to the existing consumer entry is still being observed. As a result, the consumer load indicators of the existing consumer entry are likely to meet the usefulness criterion and a greater number of consumer prefetches will be issued. On the other hand, when the subsequent observed loads of the training phase have a different observed behaviour to those observed in a previous training phase, as represented by the existing consumer entries, the existing consumer entries are more likely to meet the replacement criterion and be replaced as a result of having their confidence values modified in the first direction. In the event that the confidence in all the existing consumer entries associated with the producer-consumer relationship remain high, the candidate consumer entry is discarded.

In accordance with some example configurations the one or more usefulness metrics further comprises a timeliness value indicative of whether data loaded based on the address generated from the producer data is likely to return in time to generate a timely consumer prefetch, and wherein the training circuitry is adapted to, when a difference between the observed load and the subsequent observed load meets a difference criterion, set a candidate timeliness value of the candidate producer-consumer relationship. In this way the timeliness of consumer entries of the candidate producer-consumer relationship can be kept up to date for subsequent use to determine whether a candidate producer prefetch issued based on the candidate producer-consumer relationship will generate timely consumer prefetches. In some embodiments, the timeliness value is only considered in the generation of producer prefetches based on an initial load, whilst on the other hand producer prefetches based on a prefetch are assumed to be inherently timely because the prefetch on which they are based being inherently timely.

In accordance with some example configurations the difference between the observed load and the subsequent observed load is one of: a difference in program counter value; a number of loads; and a number of cycles. It would be readily apparent to the person of ordinary skill in the art that any measure of a temporal difference between the observed load and the subsequent observed load could be used to set the timeliness metric.

In accordance with some example configurations subsequent to the plurality of observed loads the candidate producer-consumer relationship is inserted into the pattern history table. In this way the producer pattern history table is kept up to date based on the latest observed behaviour during the training phase. When the candidate producer-consumer relationship is derived from an existing entry in the producer pattern history table, the candidate producer-consumer relationship replaces the existing entry from which it was derived. However, when the candidate producer-consumer relationship is based on a load that does not correspond to an existing entry of the producer pattern history table, the candidate producer-consumer relationship may be inserted into the producer pattern history table based on a replacement policy. Typical replacement policies will be known to the person of ordinary skill in the art. For example, the least recently used entry of the pattern history table could be replaced by the candidate producer-consumer relationship. In other embodiments, the entry in the producer pattern history table with the lowest total consumer confidence values could be replaced. When the producer pattern history table is not fill the candidate producer-consumer relationship can be inserted into the producer pattern history table without the need to replace an existing entry.

In accordance with some example configurations the data processing apparatus further comprises stride prefetching circuitry to issue a stride prefetch load based on a predicted stride length, wherein the prefetch generation circuitry is adapted to, when the stride prefetch load corresponds to the producer load indicator in the producer pattern history table, initiate the producer prefetch independent of whether the corresponding usefulness metric meets the criterion. Stride prefetching circuitry generates prefetches based on an analysis of access patterns. Because the producer prefetch is based on a stride prefetch load from the stride prefetching circuitry the producer prefetch inherently corresponds to a prefetch that will be of use. Hence, it is not necessary to check whether the corresponding usefulness metric meets the criterion. In embodiments where the one or more usefulness metrics for each entry of the plurality of consumer load entries comprises a timeliness value indicative of whether data loaded based on the address generated from the producer data is likely to return in time to generate a timely consumer prefetch, the generation of the producer prefetch from a stride prefetch load means that there is already a difference between a current program counter value and the program counter value associated with the stride prefetch. Hence, the producer prefetch will be inherently timely due to the difference already present. In this way a greater number of producer prefetches and hence consumer prefetches can be issued resulting in a lower latency observed by the processing circuitry when executing instructions.

In accordance with some example configurations the data processing apparatus further comprises producer tag table circuitry to store a producer tag table comprising a plurality of prefetch entries defining in-flight prefetches, each prefetch entry comprising a prefetch data address, wherein initiating each producer prefetch comprises generating a candidate producer entry for insertion into the producer tag table, and wherein initiating each consumer prefetch comprises generating a candidate consumer entry for insertion into the producer tag table. In this way, the producer tag table circuitry is able to keep track of each in flight prefetch and to ensure that consumer prefetches are scheduled subsequent to the completion of the corresponding producer prefetch.

In accordance with some example configurations each entry in the producer tag table further comprises a prefetch identifier, wherein the data processing apparatus is adapted to, in response to generation of the candidate producer entry: when a candidate prefetch data address of the candidate producer matches an existing entry in the producer tag table, discard the candidate producer entry; when the candidate prefetch data address of the producer entry corresponds to a same cache line as an existing entry in the producer tag table, insert the candidate producer entry into the producer tag table with a same prefetch identifier as the existing entry; and when the candidate prefetch data address of the candidate producer entry is different to all existing entries in the producer tag table, insert the candidate producer entry into the producer tag table with a new prefetch identifier. In this way the data processing apparatus is prevented from issuing producer prefetches corresponding to a same block of memory twice. In particular, where the candidate prefetch data address matches an existing entry, the existing entry will already ensure that the data is prefetched. Hence, issuing the candidate producer as a second prefetch for the same data would be wasteful and it is discarded. Alternatively, when the candidate prefetch data address of the producer entry corresponds to the same cache line as an existing entry in the producer tag table, but to a different entry within the cache line, the candidate producer entry is added into the producer tag table to indicate that a different entry from the cache line is required, but a same prefetch identifier as the existing entry is used to prevent the data processing apparatus from issuing a prefetch for the same cache line multiple times. Finally, if the candidate prefetch data address is different to all existing entries in the producer tag table then the candidate producer entry corresponds to a different prefetch and it is inserted into the producer tag table with a new prefetch identifier.

In accordance with some example configurations the data processing apparatus further comprises a sequence buffer to store the data returned from the producer prefetch in association with data indicative of a corresponding producer tag table entry; and sequencer circuitry to, when the data returned from the producer prefetch reaches a head of the sequence buffer: sequentially generate a plurality of consumer addresses to be sent as the one or more consumer prefetches; and invalidate the corresponding producer tag table entry. In this way the consumer prefetches are held until the corresponding data from the producer prefetch is returned to the sequence buffer. Once the data has been returned and the data reaches the head of the sequence buffer, the sequencer circuitry generates the consumer addresses based on the data that has been returned and issues the plurality of consumer prefetches. Once the plurality of consumer prefetches are issued the corresponding producer entry in the producer tag table can be invalidated.

Particular embodiments will now be described with reference to the figures.

FIG. 1 illustrates details of a data processing apparatus 10 in accordance with some example configurations. The data processing apparatus 10 comprises: processing circuitry 12 to execute instructions; a data cache 14 to store local copies of data items for use during execution of the instructions by the processing circuitry 12; a producer pattern history table 18 to store a plurality of producer-consumer relationships 30(1), 30(2), . . . , 30(N), where the number in parentheses indicates which entry of the pattern history table the corresponding information relates to; and prefetch generation circuitry 16 to generate a prefetch of data for the data cache 14 based on a data load from an address. Each of the producer-consumer relationships 30 comprises a producer load indicator 20 and a plurality of consumer load entries. Each consumer load entry comprises a consumer load indicator 22, 26 and one or more usefulness metrics 24, 28. The prefetch generation circuitry 16 is adapted to determine, in response to a data load, if the data load corresponds to a producer load indicator 20 of a producer-consumer relationship 30 in the producer pattern history table 18 and if at least one of the corresponding usefulness metrics 24, 28 meets a criterion. When the aforementioned conditions are satisfied, the prefetch generation circuitry 16 initiates a producer prefetch of the data and, when the data is returned, the prefetch generation circuitry 16 issues one or more consumer prefetches, each consumer prefetch to return corresponding consumer data from a corresponding consumer address generated from the data returned by the producer prefetch and a corresponding consumer load indicator 22, 26.

Figure 2:
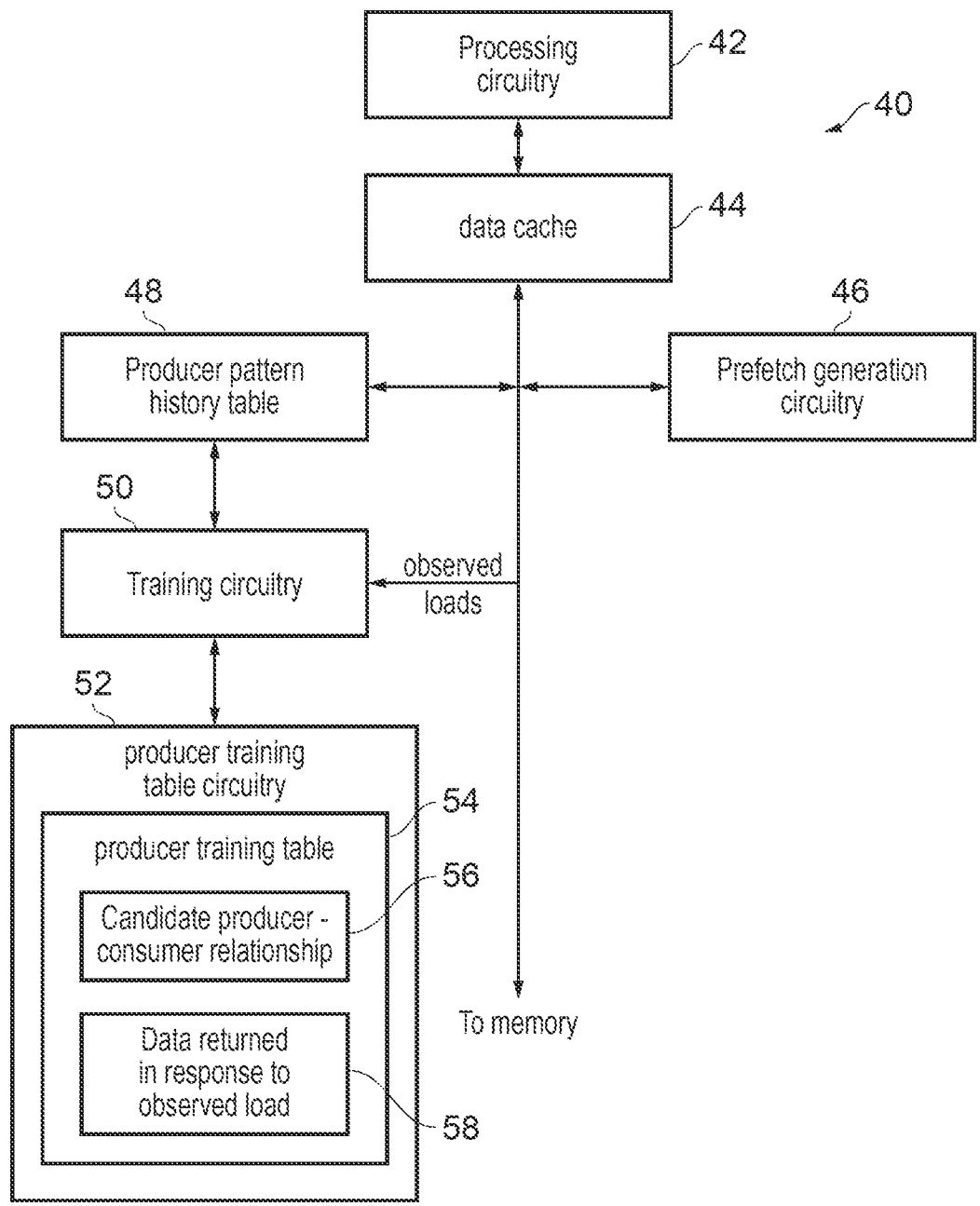
FIG. 2 schematically illustrates details of a data processing apparatus comprising training circuitry in some embodiments.

FIG. 2 illustrates details of a data processing apparatus 40 comprising training circuitry 50 for use in the training phase. The data processing apparatus 40 comprises a number of components common to the data processing apparatus 10 described in detail in reference to FIG. 1, and these common features will therefore only briefly be described here. The data processing apparatus 40 comprises processing circuitry 42, a data cache 44, prefetch generation circuitry 46 and a producer pattern history table 48. In addition, data processing apparatus 40 comprises training circuitry 50 and producer training table circuitry 52 to store a producer training table 54. The training circuitry 50 is adapted to populate a candidate producer-consumer relationship 56 stored in the producer training table 54 during a training phase based on a plurality of observed loads. The producer training table 54 comprises the candidate producer-consumer relationship 56 and data returned in response to an observed load 58 at the start of the training phase. When the observed load corresponds to a producer-consumer relationship 30 in the producer pattern history table the candidate producer-consumer relationship 56 is derived from the corresponding producer-consumer relationship 30. For example, when the observed load corresponds to producer-consumer relationship 30(b), the candidate producer-consumer relationship 56 is derived from the producer-consumer relationship 30(b). The candidate producer-consumer relationship in this example case comprises information relating to a producer load indicator 20(b) and a plurality of consumer load entries. Each consumer load entry comprises a consumer load indicator 22(b), 26(b) and one or more usefulness metrics 24(b), 28(b). During the training phase the training circuitry 50 updates the candidate producer-consumer relationship 56 stored in the producer training table 54 based on a plurality of observed loads. Once the training phase is completed, the training circuitry 50 enters the candidate producer-consumer relationship 56 into the producer pattern history table 48 for use in subsequent producer prefetches and consumer prefetches.

Figure 3:
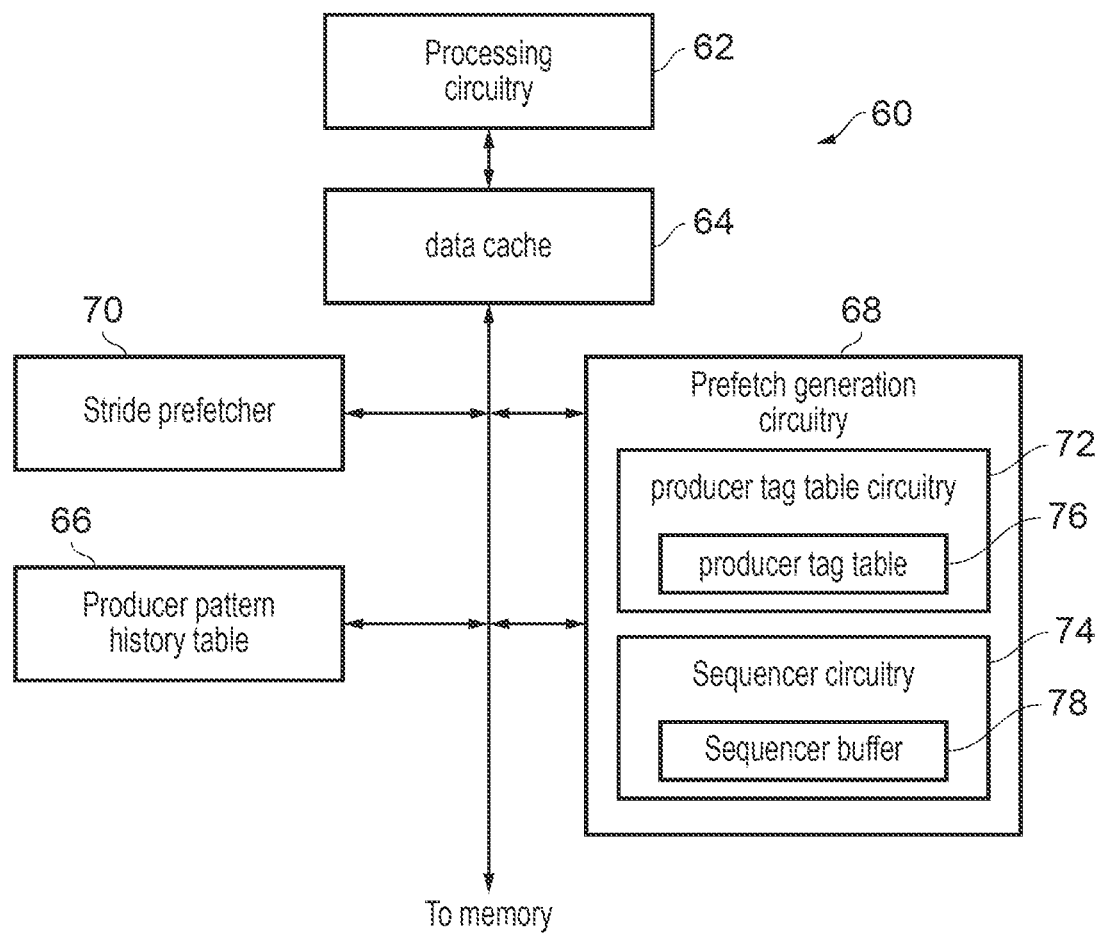
FIG. 3 schematically illustrates details of a data processing apparatus comprising a stride prefetcher in some embodiments.

FIG. 3 illustrates details of a data processing apparatus 60 comprising stride prefetcher 70, producer tag table circuitry 72 and sequence circuitry 74 for use in prefetch generation. The data processing apparatus 60 comprises a number of components common to the data processing apparatus 10 described in detail in reference to FIG. 1, and these common features will therefore only briefly be described here. The data processing apparatus 60 comprises processing circuitry 62, data cache 64, prefetch generation circuitry 68, and producer pattern history table 66. In addition, data processing apparatus 60 comprises stride prefetcher 70 to issue a stride prefetch load based on a predicted stride length, producer tag table circuitry 72 to store producer tag table 76, and sequencer circuitry 74 comprising sequence buffer 78. The stride prefetcher 70 generates and issues stride prefetches based on an analysis of access patterns. Prefetches generated by the stride prefetcher 70 are passed to the prefetch generation circuitry 68 which performs a lookup of the stride prefetch in the producer pattern history table 66. When the stride prefetch corresponds to a producer indicator in the producer pattern history table 66 the prefetch generation circuitry 68 issues a producer prefetch. The producer tag table circuitry 72 determines, for producer prefetches generated based on the stride prefetch or otherwise, whether an entry in the producer tag table 76 corresponds to a same address as the producer prefetch. When this is the case the producer tag table circuitry 72 discards the producer prefetch. The producer tag table circuitry 72 also determines whether an entry in the producer tag table 76 corresponds to an address of a same cache line as the producer prefetch. When this is the case the producer prefetch is entered in the producer tag table but with a prefetch identifier that corresponds to the existing entry in the producer tag table 76 corresponding to the same cache line. When neither of the aforementioned conditions are met, i.e., the producer prefetch does not correspond to a same cache line or a same address as an existing entry in the producer tag table 76, the producer tag table circuitry is adapted to enter the producer prefetch in the producer tag table 76 with a new prefetch identifier. The sequencer buffer 78 stores data returned from producer prefetches and associated data indicative of a corresponding entry in the producer tag table 76. When the data returned from the producer prefetch reaches the head of the sequence buffer 78 the sequencer circuitry 74 is adapted to sequentially generate one or more consumer addresses to be sent as the one or more consumer prefetches, and to invalidate the corresponding entry in the producer tag table 76.

Figure 4:
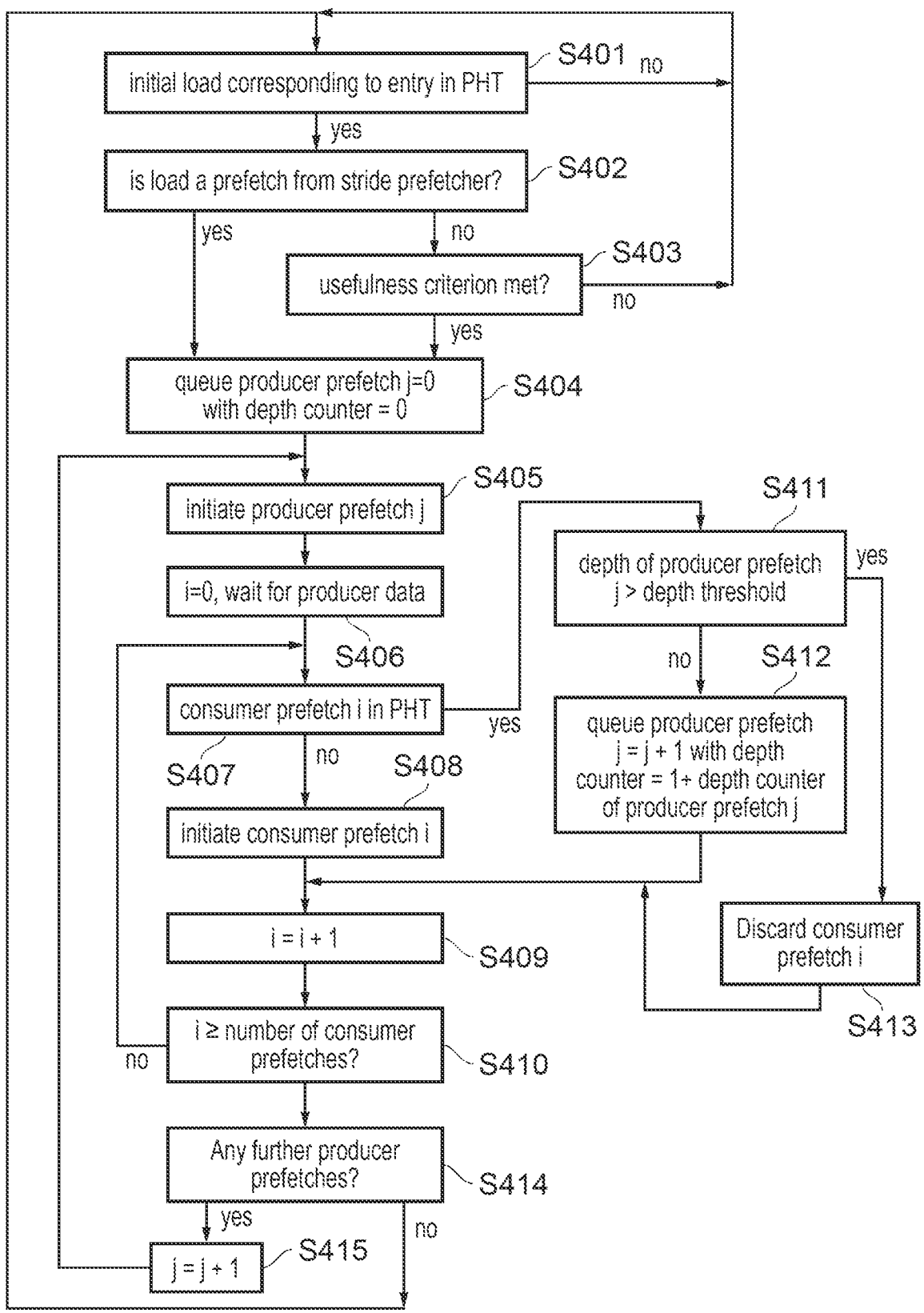
FIG. 4 illustrates a sequence of steps carried out when initiating prefetches in some embodiments.

FIG. 4 illustrates a sequence of steps carried out by prefetch generation circuitry 68 when initiating prefetches. Flow starts at step S401 when an initial load is received and the prefetch generation circuitry 68 determines whether or not the initial load corresponds to a producer indicator stored in the producer pattern history table 66. If no then flow returns to step S401 to wait for another initial load. If yes, then flow proceeds to step S402 where it is determined whether the load is a prefetch generated by the stride prefetcher 70. If yes then flow proceeds to step S404, if no then flow proceeds to step S403 where it is determined whether the usefulness criterion is met. If, at step S403, the usefulness criterion is not met then flow returns to step S401. If however, the usefulness criterion is met then flow proceeds to step S404 where the producer prefetch is queued with producer prefetch counter j=0 and producer depth counter=0. Flow then proceeds to step S405 where producer prefetch j is issued and step S406 where consumer prefetch index i=0 is set and flow waits for the producer data to be returned.

When the producer data is returned, flow proceeds to steps S407-S412 which determine the handling of consumer prefetches. Whilst the steps set out in steps S407-S412 of FIG. 4 illustrate the sequential issuing of consumer prefetches for each producer prefetch, consumer prefetch index i is used purely to illustrate the logical flow of how each consumer load is handled, and that consumer prefetches associated with a same producer load may all be issued in sequence or in parallel. At step S407 it is determined whether consumer prefetch i of the producer-consumer relationship j corresponds to a producer indicator in the producer pattern history table 66. If no then flow proceeds to step S408 where consumer prefetch i is issued before flow proceeds to step S409. If however, at step S407 it was determined that consumer prefetch i of the producer-consumer relationship j did correspond to a producer indicator in the producer pattern history table 66, then flow proceeds to step S411. At step S411 it is determined whether the depth of producer prefetch j is greater than the depth threshold. If no then flow proceeds to step S412 where the consumer prefetch i is upgraded to be issued as a producer prefetch with index j=j+1 and depth counter equal to 1+the depth counter of producer prefetch j before flow proceeds to step S409. If on the other hand, it was determined at step S411 that the depth of producer prefetch j was greater than the depth threshold then flow proceeds to step S413 where consumer prefetch i is discarded before flow proceeds to step S409. In some embodiments at step S413 consumer prefetch i may be issued as a consumer prefetch rather than being discarded. However, because the depth threshold would be reached if the consumer prefetch i was upgraded to a producer prefetch, a producer prefetch for the corresponding data is not issued. At step S409 the index i is incremented before flow proceeds to step S410. At step S410 it is determined whether all consumer prefetches associated with producer prefetch j have been handled. If no then flow returns to step S407 and the next consumer prefetch is handled. If, on the other hand, it is determined at step S410 that all the consumer prefetches have been handled then flow proceeds to step S414 where it is determined if there are any more producer prefetches. If yes then flow proceeds to step S415 where j is incremented and flow returns to step S405.

If, at step S414, it is determined that there are no further prefetches then flow returns to step S401.

Figure 5:
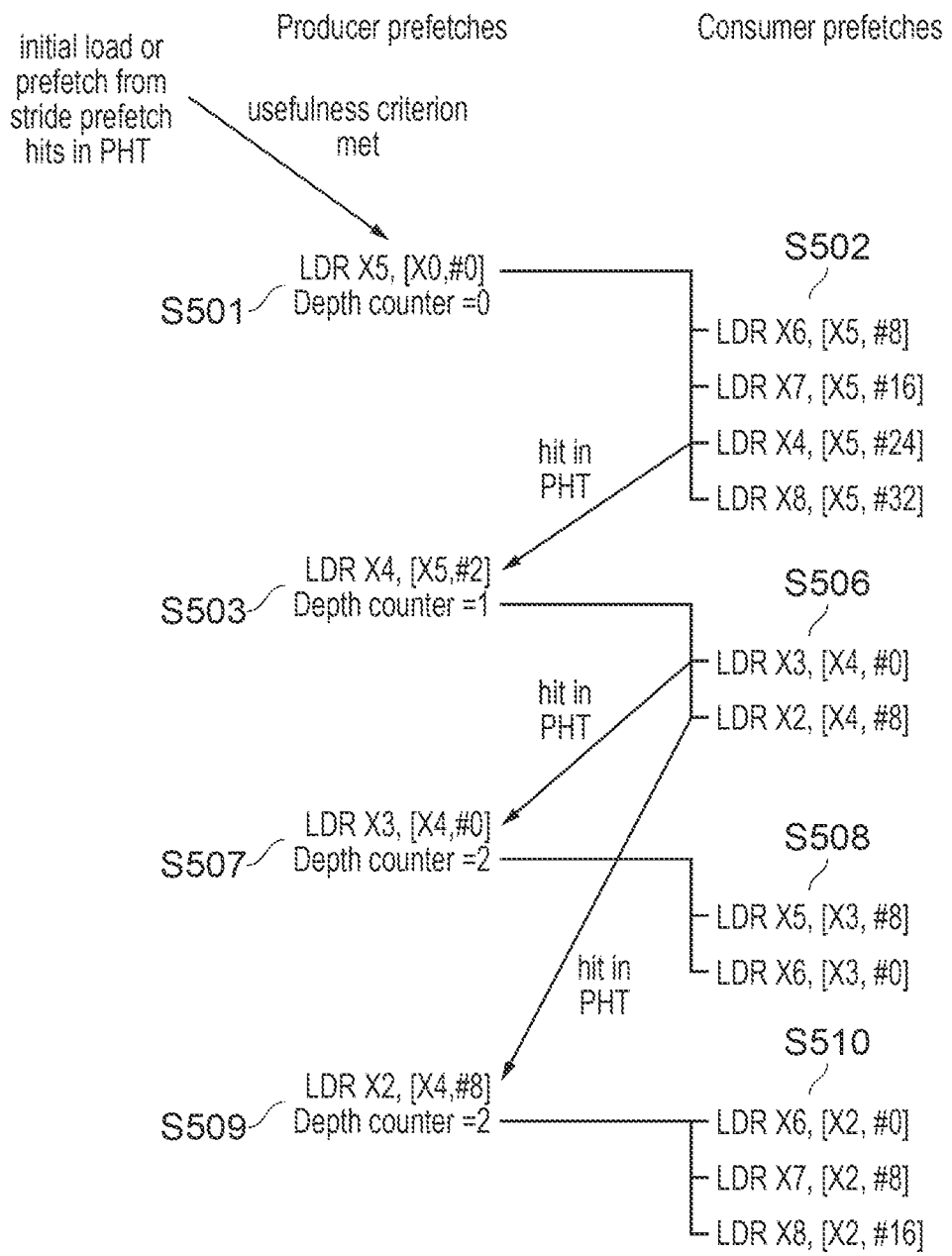
FIG. 5 illustrates a sequence of producer and consumer prefetches being processed in some embodiments.

FIG. 5 illustrates a sequence of producer and consumer prefetches issued based on the logic set out in FIG. 4. As illustrated, in response to an initial load instruction or a prefetch from the stride prefetcher corresponding to instruction LDR x5, [x0, #0] it is found that the load or prefetch from the stride prefetcher hits in the producer pattern history table 66. As a result, at S501, a producer prefetch with depth counter=0 is issued. When the data associated with producer prefetch corresponding to instruction LDR x5, [x0, #0] is returned, the consumer prefetches associated with the producer prefetch can be issued. In this case, at step S502 four consumer prefetches are issued. In particular, in the illustrated embodiment for a consumer prefetch associated with a particular producer prefetch to be issued, the consumer prefetch must meet a confidence threshold. In this case the four consumer prefetches corresponding to load instructions LDR x6, [x5, #8]; LDR x7, [x5, #16]; LDR x4, [x5, #24]; and LDR x8, [x5, #32] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that the consumer prefetch corresponding to load instruction LDR x4, [x5, #24] hits in the producer pattern history table 66 and this prefetch is upgraded to a producer prefetch.

At step S503 the producer prefetch upgraded from the consumer prefetch corresponding to load instruction LDR x4, [x5, #24], as identified in step S502, is issued with depth counter=1. When the data associated with the producer prefetch corresponding to load instruction LDR x4, [x5, #24] is returned, the consumer prefetches associated with the producer prefetch can be issued. In this case, at step S506 it is determined that two consumer prefetches are issued. In this case the two consumer prefetches corresponding to load instructions LDR x3, [x4, #0]; and LDR x2 [x4, #8] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that both the consumer prefetch corresponding to load instruction LDR x3, [x4, #0] and the consumer prefetch corresponding to load instruction LDR x2 [x4,#8] hit in the producer pattern history table 66 and both these prefetches are upgraded to producer prefetches which are issued at step S507 and S509 respectively.

At step S507 the producer prefetch upgraded from the consumer prefetch corresponding to load instruction LDR x3, [x4, #0], as identified in step S506, is issued with depth counter=2. When the data associated with the producer prefetch corresponding to load instruction LDR x3, [x4, #0] is returned, the consumer prefetches associated with the producer prefetch can be issued. In this case, at step S508 it is determined that two consumer prefetches are issued. In this case the two consumer prefetches corresponding to load instructions LDR x5, [x3, #8]; and LDR x6 [x3, #0] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that neither of the consumer prefetches corresponding to load instruction LDR x3, [x4. #0] and the consumer prefetch corresponding to load instruction LDR x2 [x4,#8] hit in the producer pattern history table 66. Hence, neither prefetch is upgraded to a producer prefetch and no further prefetches are generated as a result of this step.

At step S509 the producer prefetch upgraded from the consumer prefetch corresponding to load instruction LDR x2, [x4, #8], as identified in step S506, is issued with depth counter=2. When the data associated with the producer prefetch corresponding to load instruction LDR x2, [x4, #8] is returned, the consumer prefetches associated with the producer prefetch can be issued. In this case, at step S508 it is determined that three consumer prefetches are issued. In this case the three consumer prefetches corresponding to load instructions LDR x6, [x2, #0]; LDR x7, [x2, #8]; and LDR x8 [x2, #16] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that none of the consumer prefetches corresponding to load instructions LDR x6, [x2, #0]; LDR x7, [x2, #8]; and LDR x8 [x2, #16] hit in the producer pattern history table 66. Hence, none of these prefetches are upgraded to a producer prefetch and no further prefetches are generated as a result of this step.

Figure 6:
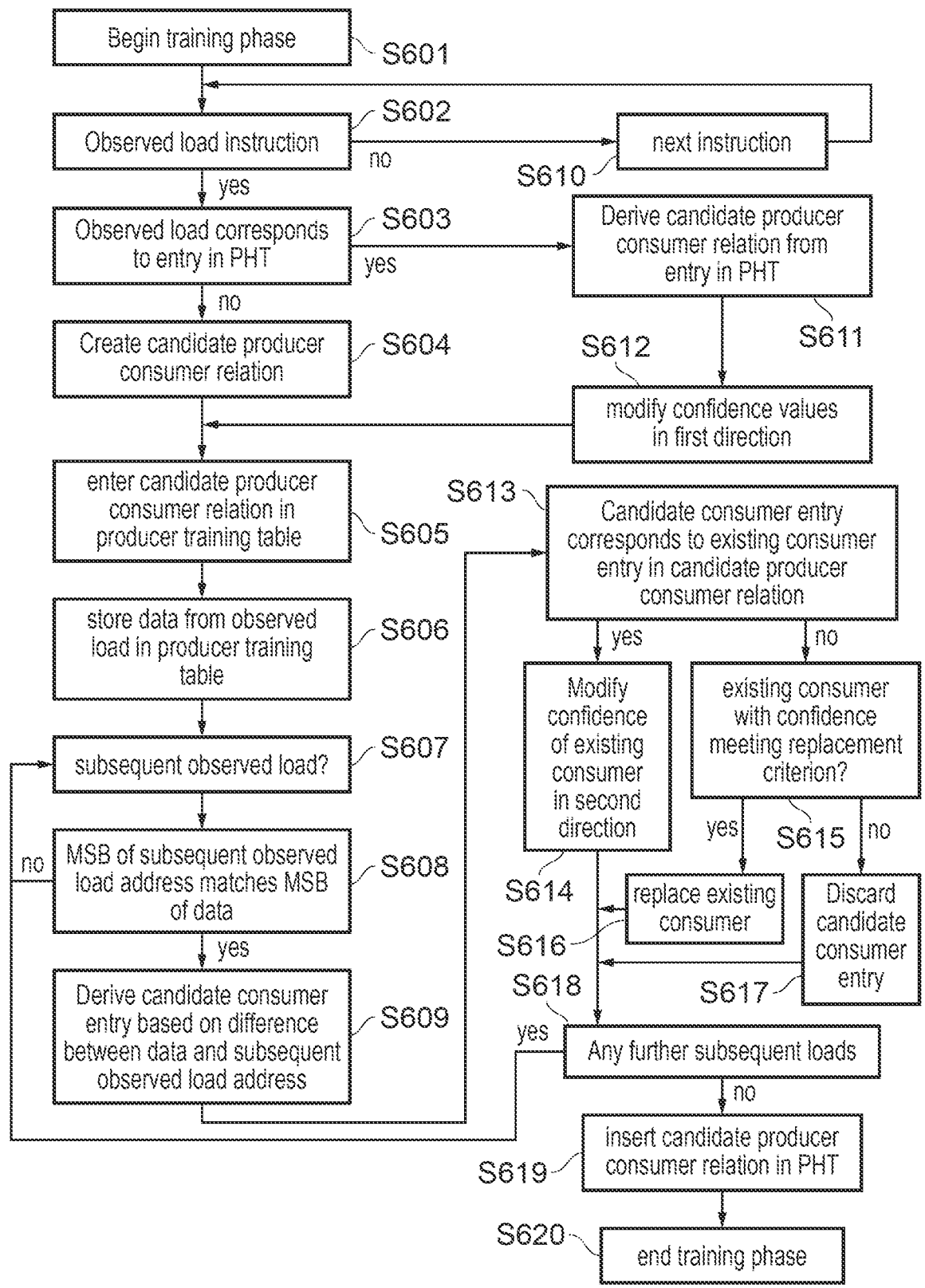
FIG. 6 illustrates a sequence of steps carried out during a training phase in some embodiments.

FIG. 6 illustrates a sequence of steps carried out by the data processing apparatus during a training phase with reference to the components set out in FIG. 2. Flow begins at step S601 where the data processing apparatus begins the training phase before flow proceeds to step S602. At step S602 it is determined whether a load instruction has been observed. If no then flow proceeds to step S610 where flow waits for the next instruction. If, at step S602, it is determined that a load instruction has been observed flow proceeds to step S603. At step S603 it is determined whether the observed load corresponds to an entry in the producer pattern history table 48. If yes then flow proceeds to step S611 where a candidate producer consumer relationship 56 is derived from the entry in the producer pattern history table 48. Flow then proceeds to step S612 where the confidence values, associated with the producer-consumer relationship 56 derived from the entry in the producer pattern history table 48, are modified in a first direction to indicate that confidence in the consumer identifiers associated with the candidate producer-consumer relationship is reduced. Flow then proceeds to step S605. If however, at step S603, it was determined that the observed load does not correspond to an entry in the producer pattern history table 48 then flow proceeds to step S604 where a candidate producer consumer relationship 56 is created based on the observed load before flow proceeds to step S605.

At step S605 the candidate producer-consumer relationship 56 that was either derived at step S611 or created at step S604 is entered into the producer training table 54 that is stored in the producer training table circuitry 52. Flow then proceeds to step S606 at which data returned in response to the observed load 58 is stored in the producer training table 54 that itself is stored in the producer training table circuitry 42. Flow then proceeds to step S607 where flow waits for a subsequent observed load. When a subsequent observed load is observed flow proceeds to step S608 where it is determined whether the most significant bit (MSB) of the subsequent observed load address matches the most significant bit of the data returned in response to the observed load 58. If, at step S608, there is not an observed match then flow returns to step S607 to wait for the next subsequent observed load. If however, at step S608, it is determined that there is a match then flow proceeds to step S609, where a candidate consumer entry is derived based on the difference between the data returned in response to the observed load 58 and the subsequent observed load address. Flow then proceeds to step S613 where it is determined whether the candidate consumer entry, derived in step S609, corresponds to an existing consumer entry in the candidate producer consumer relationship 56. If yes then flow proceeds to step S614 where the confidence value of the corresponding existing consumer is modified in a second direction to indicate that a confidence of observing the existing consumer subsequent to the producer load is increased. Flow then proceeds to step S618. If however, at step S613, it was determined that the candidate consumer entry does not correspond to any existing consumer entries in the candidate producer-consumer relationship 58 then flow proceeds to step S615. At step S615 it is determined whether there are any existing consumers with confidence values meeting the replacement criterion. If yes then flow proceeds to step S616 where the candidate consumer entry replaces the existing consumer entry before flow proceeds to step S618. If however, at step S615 it was determined that there are no existing consumer entries with confidence meeting the replacement criterion then flow proceeds to step S617 where the candidate consumer entry is discarded before flow proceeds to step S618. At step S618 it is determined whether there are any further subsequent loads to be observed. If yes then flow returns to step S607. If however, at step S618, it is determined that a sufficient number of subsequent loads have been observed then flow proceeds to step S619 where the candidate producer-consumer relationship 56 is inserted into the producer pattern history table 48 before flow proceeds to step S620 where the training phase ends.

Figure 7:
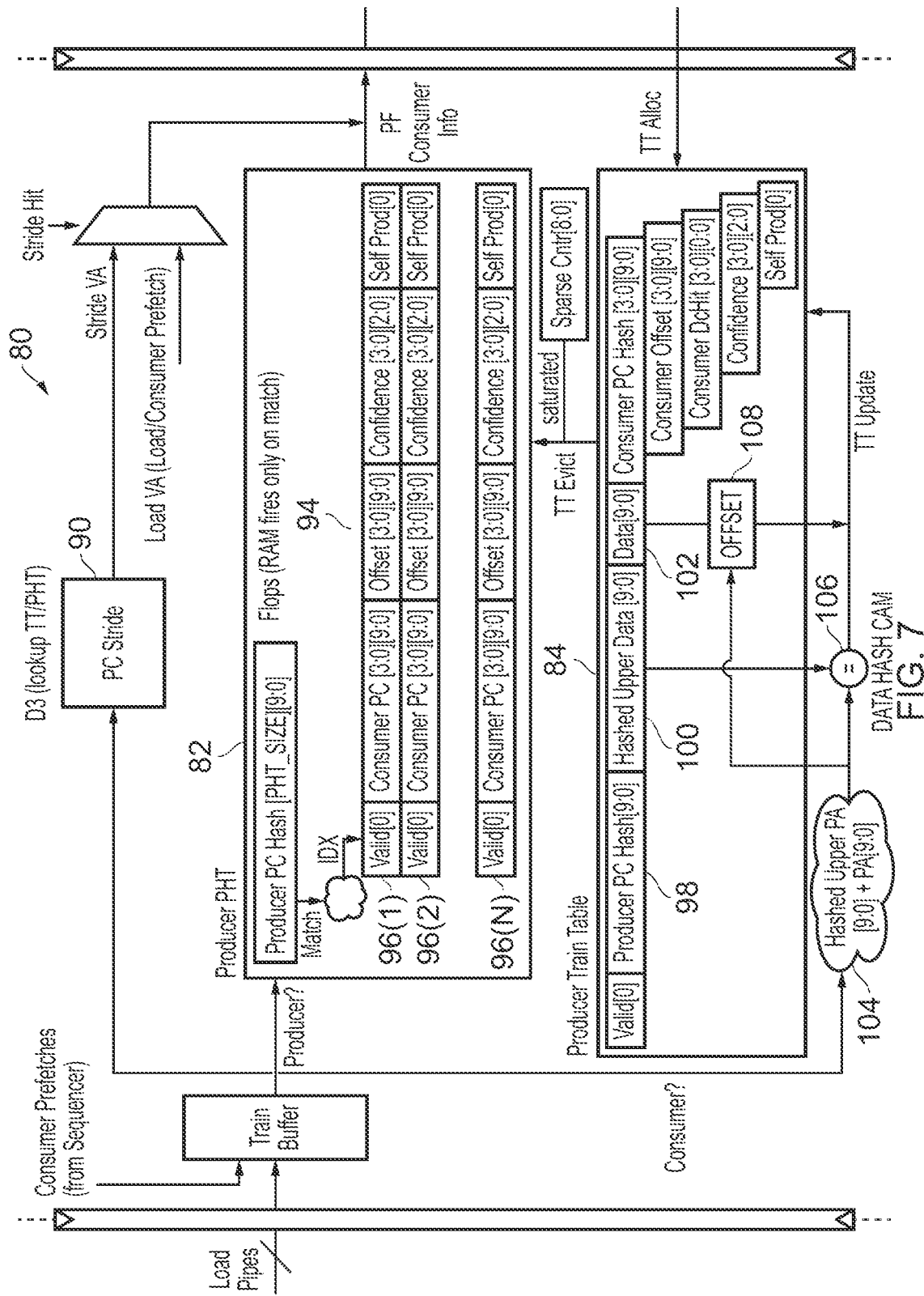
FIG. 7 schematically illustrates more details of a data processing apparatus in some embodiments.
Figure 7:
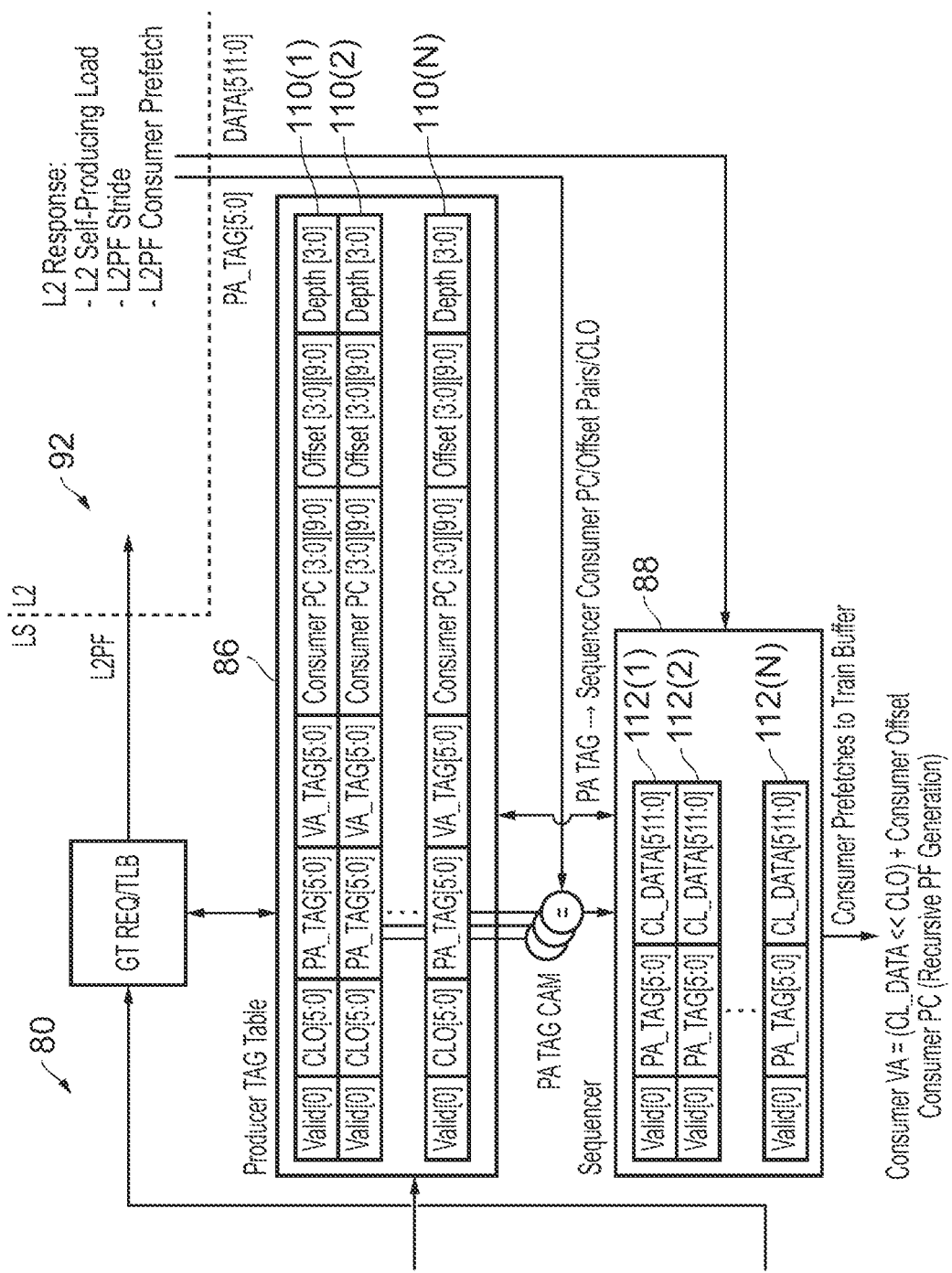

FIG. 7 illustrates a data processing apparatus according to some example configurations. Data processing apparatus 80 comprises producer pattern history table 82, producer training table 84, producer tag table 86, sequencer 88, stride prefetcher 90 and cache 92. Producer pattern history table 82 stores a plurality of producer-consumer relationships 92 which may be indexed by a producer indicator corresponding to a hash of the producer program counter value. The number of producer-consumer relationships 92 stored in the producer pattern history table 82 can be any number. For example, in some embodiments producer pattern history table 82 could store sixty four producer-consumer relationships 94. However, in other embodiments a greater or smaller number of producer-consumer relationships could be included. Each producer-consumer relationship 94 stores comprises a producer load indicator and a plurality of consumer entries 96. Any number of consumer entries could be provided in each producer-consumer relationship. A greater number of consumer entries provides allows the producer pattern history table 82 to store associations between a producer identifier and a greater number of consumer identifiers. However, in contrast, a greater number of consumer entries requires a greater circuit area and power consumption and may be of limited benefit for cases in which each producer load only has a small number of associated consumer loads. In some embodiments a balance between storing associations between producers and consumers is traded off against circuit area. In some embodiments each producer-consumer relationship comprises four entries. Each consumer entry 96 in the producer pattern history table comprises valid bits to indicate whether the entry is valid, a consumer program counter (PC) value to indicate a corresponding load instruction, an offset to be used to generate a consumer address based on data returned from a producer load, and a confidence value indicative of whether a previous load based on the corresponding consumer address was issued subsequent to the producer load.

The producer training table 84 is used during a training phase and stores a candidate producer-consumer relationship 98 which is derived in response to a load observed at the start of the training phase and, when the load observed at the start of the training phase corresponds to an entry in the producer pattern history table 82, is based on the corresponding entry in the producer pattern history table 82. Alternatively, when the load observed at the start of the training phase does not correspond to an entry in the producer pattern history table 82, the candidate producer consumer relationship 98 is a new entry based on the load observed at the start of the training phase. The candidate producer-consumer relationship 98 comprises valid bits, a producer program counter value which may be stored as a hashed value, upper bits of the data 100 returned from the load observed at the start of the training phase which may be stored as a hashed value, lower bits of data 102 returned from the load observed at the start of the training phase, and a plurality of consumer entries as described in relation to the producer-consumer relations stored in the producer pattern history table 82. As illustrated, during the training phase and in response to a subsequent observed load with a corresponding address, the upper bits of the corresponding address may be hashed and compared to the hashed upper bits of data 100 returned from the load observed at the start of the training phase. If a match is determined 106 then an offset 108 is derived based on a difference between the lower bits of data 102 returned from the load observed at the start of the training phase and the lower bits of the corresponding address. The offset 108 then forms part of a candidate consumer entry to be entered into the candidate producer-consumer relationship 98 according to the previously described logic. At the end of the training phase the candidate producer-consumer relationship may be entered into the producer pattern history table based on a replacement or eviction policy.

The producer tag table 86 stores a plurality of prefetch entries 110 defining in-flight prefetches. Each prefetch entry corresponding to a producer prefetch entry comprises a valid bit, a cache line offset (CLO) of the producer data, a physical address tag of the producer data, a virtual address tag of the producer data, data indicative of a plurality of consumer program counter values and corresponding offsets, and a depth counter. In addition, the producer tag table may store information indicative of consumer prefetch entries. In the case of consumer prefetches, there is no need for the producer tag table 86 to store, in association with the consumer prefetch entry, information indicative of further consumer prefetch entries. Producer prefetch entries 110 in the producer tag tale further comprise a prefetch identifier. A producer prefetch is entered into the producer tag table 86 if there are no existing entries in the producer tag table 86 that have a same address as the producer prefetch to be entered. When the producer prefetch to be entered does not have an address corresponding to an existing entry in the producer tag table the producer prefetch is entered into the table. When the address corresponding to the producer new entry matches a same cache line as an existing entry in the table, the new producer prefetch entry is given the same identifier as the existing entry. If however, the new producer prefetch entry does not match a cache line of an existing entry then the new producer prefetch entry is given a new prefetch identifier.

The sequencer 88 stores a plurality of entries 112 comprising a valid bit, a physical address tag of the producer data and data returned from the producer load. When an entry 112 reaches the head of the sequence buffer stored in the sequencer 88 the sequencer 88 references the information in the producer tag table 86 and the producer pattern history table 82 to generate the consumer prefetches based on the data returned from the producer prefetch. Once the consumer prefetches have been sent the corresponding entry in the producer tag table 86 is invalidated.

The stride prefetcher 90 is used to issue stride prefetches based on a predicted stride length. Because the stride prefetches necessarily correspond to data fetches ahead of the point that they would be fetched in program order, they are inherently timely and can be used to generate producer prefetches for which the data associated with the prefetch will return in time to generate the corresponding consumer prefetches.

Figure 8:
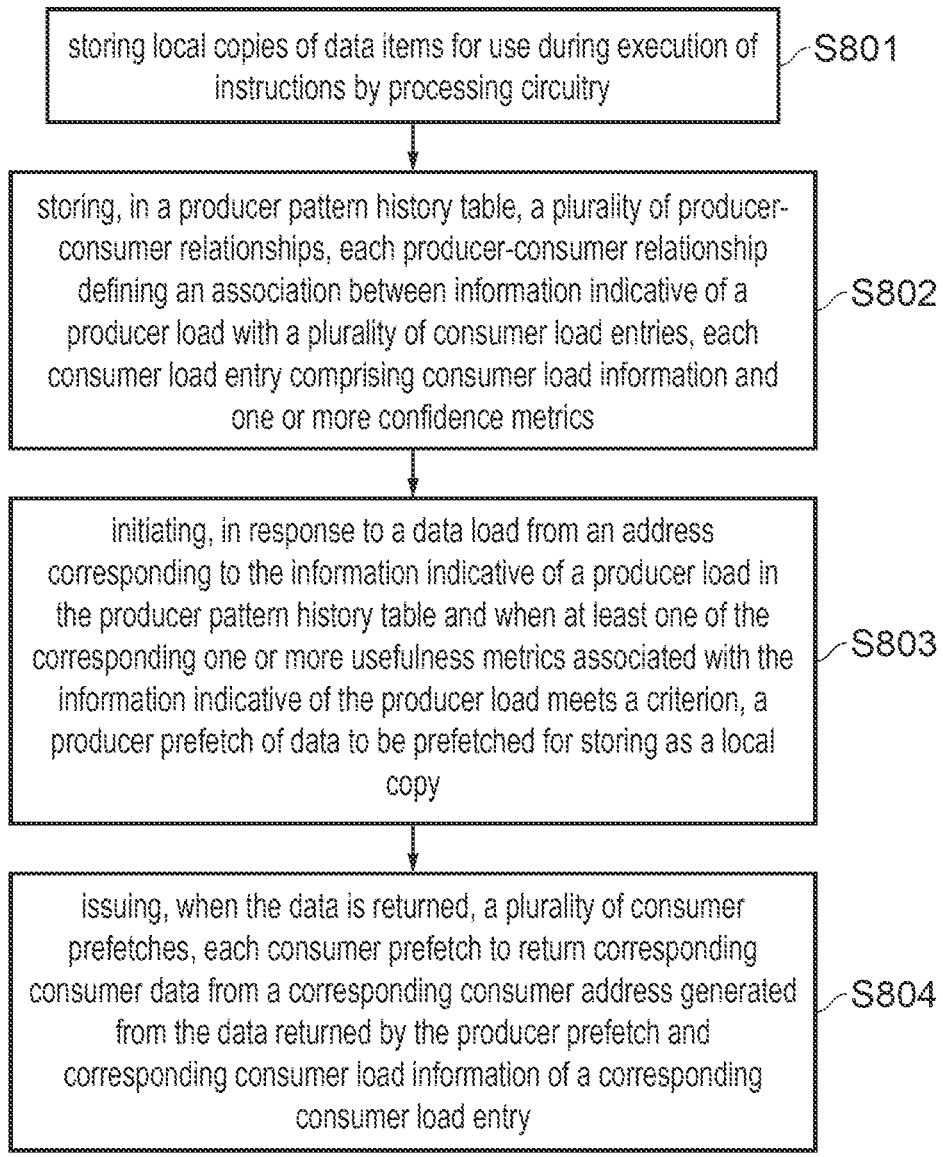
FIG. 8 illustrates a sequence of steps carried out by in some embodiments.

FIG. 8 illustrates a sequence of steps carried out by the data processing apparatus in some example embodiments. At step S801 local copies of data items for use during execution of instructions by processing circuitry are stored. At step S802 a plurality of producer-consumer relationships are stored in a producer pattern history table, each producer-consumer relationship defining an association between producer load indicator and a plurality of consumer load entries, each consumer load entry comprising a consumer load indicator and one or more usefulness metrics. At step S803 a producer prefetch of data to be prefetched for storing as a local copy is initiated in response to a data load from an address corresponding to the producer load indicator in the producer pattern history table and when at least one of the corresponding one or more usefulness metrics associated with the producer load indicator meets a criterion. Finally, at step S804, when the data is returned, one or more consumer prefetches are issued, each consumer prefetch to return corresponding consumer data from a corresponding consumer address generated from the data returned by the producer prefetch and a corresponding consumer load indicator of a corresponding consumer load entry.

In brief overall summary data processing apparatuses and methods of processing data are disclosed. The operations comprise: storing copies of data items; and storing, in a producer pattern history table, a plurality of producer-consumer relationships, each defining an association between producer load indicator and a plurality of consumer load entries, each consumer load entry comprising a consumer load indicator and one or more usefulness metrics. Further steps comprise: initiating, in response to a data load from an address corresponding to the producer load indicator in the producer pattern history table and when at least one of the corresponding one or more usefulness meets a criterion, a producer prefetch of data to be prefetched for storing as a local copy: and issuing, when the data is returned, one or more consumer prefetches to return consumer data from a consumer address generated from the data returned by the producer prefetch and a consumer load indicator of a consumer load entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
a data cache to store local copies of data items for use during execution of instructions by processing circuitry;
a producer pattern history table to store a plurality of producer-consumer relationships, each producer-consumer relationship defining an association between a producer load indicator and a plurality of consumer load entries, each consumer load entry comprising a consumer load indicator and one or more usefulness metrics; and
prefetch generation circuitry to generate a prefetch of data for the data cache based on a data load from an address,
wherein the prefetch generation circuitry is adapted to, when the data load corresponds to the producer load indicator in the producer pattern history table and when at least one of the corresponding one or more usefulness metrics associated with the producer load indicator meets a criterion:
initiate a producer prefetch of the data; and
when the data is returned, issue one or more consumer prefetches, each consumer prefetch to return corresponding consumer data from a corresponding consumer address generated from the data returned by the producer prefetch and a corresponding consumer load indicator of a corresponding consumer load entry.

2. The data processing apparatus of claim 1, wherein the consumer load indicator comprises an offset in address space between the data returned by the producer prefetch and the corresponding consumer address.

3. The data processing apparatus of claim 1, wherein when the consumer load indicator corresponds to a further producer load indicator in the pattern history table, the consumer prefetch is issued as a further producer prefetch.

4. The data processing apparatus of claim 3, wherein issuing the further producer prefetch is independent of whether the corresponding usefulness metric meets the criterion.

5. The data processing apparatus of claim 3, wherein the further producer prefetch is associated with a prefetch depth counter indicative of a number of preceding producer prefetches from which the further producer prefetch is derived, and
wherein when the prefetch depth counter reaches a depth threshold, the further producer prefetch is discarded.

6. The data processing apparatus of claim 1, wherein the one or more usefulness metrics for each entry of the plurality of consumer load entries comprises a confidence value indicative that a previous load based on the corresponding consumer address was issued subsequent to the producer load, and
wherein the criterion being met requires the confidence value to reach a confidence threshold.

7. The data processing apparatus of claim 6, wherein the one or more usefulness metrics for each entry of the plurality of consumer load entries comprises a timeliness value indicative of whether data loaded based on the address generated from the producer data is likely to return in time to generate a timely consumer prefetch, and
wherein the criterion being met further requires the timeliness value to indicate that the producer data is likely to return in time to generate the timely consumer prefetch.

8. The data processing apparatus of claim 1, further comprising producer training table circuitry to store a producer training table comprising a candidate producer-consumer relationship, and
training circuitry to populate the candidate producer-consumer relationship during a training phase based on a plurality of observed loads.

9. The data processing apparatus of claim 8, wherein the one or more usefulness metrics comprises a confidence value indicative that a previous load based on the corresponding consumer address was issued subsequent to the producer load, and the training circuitry is adapted to, at the start of the training phase:
when an observed load of the training phase corresponds to an existing producer load indicator in one of the plurality of producer-consumer relationships stored in the pattern history table:
derive a candidate producer-consumer relationship from the producer-consumer relationship corresponding to the observed load;
enter the candidate producer-consumer relationship into the producer training table; and
modify candidate confidence values associated with the candidate producer-consumer relationship in a first direction; and
when the observed load of the training phase does not correspond to the existing producer load indicator in any of the plurality of producer-consumer relationships stored in the pattern history table:
create the candidate producer-consumer relationship comprising information indicative of the observed load; and
enter the candidate producer-consumer relationship into the producer training table.

10. The data processing apparatus of claim 9, wherein the producer training table is adapted to store, in association with the candidate producer-consumer relationship, data returned in response to the observed load.

11. The data processing apparatus of claim 9, wherein for each subsequent observed load of the plurality of observed loads, in response to detecting a match between a most significant portion of the data returned by the observed load and a candidate address associated with the subsequent observed load, the training circuitry is adapted to derive a candidate consumer entry based on a difference between the least significant portion of the data returned by the observed load and the candidate address associated with the subsequent observed load.

12. The data processing apparatus of claim 11, wherein the training circuitry is adapted to:
when the candidate consumer entry corresponds to an existing consumer entry of the candidate producer-consumer relationship, modify an existing candidate confidence value of the existing consumer in a second direction;
when the candidate consumer entry is different from each existing consumer entry of the candidate producer-consumer relationship and when an existing consumer entry of the candidate producer-consumer relationship has a candidate confidence value that meets a replacement criterion, replace the existing consumer entry having with the candidate consumer entry; and when the candidate consumer entry is different from each existing consumer entry of the candidate producer-consumer relationship and when a corresponding candidate confidence value of each existing consumer entry does not meet the replacement criterion, discard the candidate consumer entry.

13. The data processing apparatus of claim 11, wherein the one or more usefulness metrics further comprises a timeliness value indicative of whether data loaded based on the address generated from the producer data is likely to return in time to generate a timely consumer prefetch, and
wherein the training circuitry is adapted to, when a difference between the observed load and the subsequent observed load meets a difference criterion, set a candidate timeliness value of the candidate producer-consumer relationship.

14. The data processing apparatus of claim 13, wherein the difference between the observed load and the subsequent observed load is one of:
a difference in program counter value;
a number of loads; and
a number of cycles.

15. The data processing apparatus of claim 9, wherein subsequent to the plurality of observed loads the candidate producer-consumer relationship is inserted into the pattern history table.

16. The data processing apparatus of claim 1, further comprising stride prefetching circuitry to issue a stride prefetch load based on a predicted stride length,
wherein the prefetch generation circuitry is adapted to, when the stride prefetch load corresponds to the producer load indicator in the producer pattern history table, initiate the producer prefetch independent of whether the corresponding usefulness metric meets the criterion.

17. The data processing apparatus of claim 1, further comprising producer tag table circuitry to store a producer tag table comprising a plurality of prefetch entries defining in-flight prefetches, each prefetch entry comprising a prefetch data address,
wherein initiating each producer prefetch comprises generating a candidate producer entry for insertion into the producer tag table, and
wherein initiating each consumer prefetch comprises generating a candidate consumer entry for insertion into the producer tag table.

18. The data processing apparatus of claim 17, wherein each entry in the producer tag table further comprises a prefetch identifier,
wherein the data processing apparatus is adapted to, in response to generation of the candidate producer entry:
when a candidate prefetch data address of the candidate producer matches an existing entry in the producer tag table, discard the candidate producer entry;
when the candidate prefetch data address of the producer entry corresponds to a same cache line as an existing entry in the producer tag table, insert the candidate producer entry into the producer tag table with a same prefetch identifier as the existing entry; and
when the candidate prefetch data address of the candidate producer entry is different to all existing entries in the producer tag table, insert the candidate producer entry into the producer tag table with a new prefetch identifier.

19. The data processing apparatus of claim 17, further comprising a sequence buffer to store the data returned from the producer prefetch in association with data indicative of a corresponding producer tag table entry; and
sequencer circuitry to, when the data returned from the producer prefetch reaches a head of the sequence buffer:
sequentially generate one or more consumer addresses to be sent as the one or more consumer prefetches; and
invalidate the corresponding producer tag table entry.

20. A method of processing data comprising:
storing local copies of data items for use during execution of instructions by processing circuitry;
storing, in a producer pattern history table, a plurality of producer-consumer relationships, each producer-consumer relationship defining an association between producer load indicator and a plurality of consumer load entries, each consumer load entry comprising a consumer load indicator and one or more usefulness metrics;
initiating, in response to a data load from an address corresponding to the producer load indicator in the producer pattern history table and when at least one of the corresponding one or more usefulness metrics associated with the producer load indicator meets a criterion, a producer prefetch of data to be prefetched for storing as a local copy; and
issuing, when the data is returned, one or more consumer prefetches, each consumer prefetch to return corresponding consumer data from a corresponding consumer address generated from the data returned by the producer prefetch and a corresponding consumer load indicator of a corresponding consumer load entry.

21. A data processing apparatus comprising:
means for storing local copies of data items for use during execution of instructions by processing circuitry;
means for storing, in a producer pattern history table, a plurality of producer-consumer relationships, each producer-consumer relationship defining an association between producer load indicator and a plurality of consumer load entries, each consumer load entry comprising consumer load indicator and one or more usefulness metrics;
means for initiating, in response to a data load from an address corresponding to the producer load indicator in the producer pattern history table and when at least one of the corresponding one or more usefulness metrics associated with the producer load indicator meets a criterion, a producer prefetch of data to be prefetched into the means for storing based on the data load; and
means for issuing, when the data is returned, one or more consumer prefetches, each consumer prefetch to return corresponding consumer data from a corresponding consumer address generated from the data returned by the producer prefetch and a corresponding consumer load indicator of a corresponding consumer load entry.

* * * * *